(12) United States Patent
Alsalemi et al.

(10) Patent No.: US 11,308,823 B2
(45) Date of Patent: Apr. 19, 2022

(54) USING THERMOCHROMIC INK FOR BLOOD SIMULATION IN MEDICAL TRAINING

(71) Applicant: QATAR UNIVERSITY, Doha (QA)

(72) Inventors: Abdullah Alsalemi, Doha (QA); Mohammed Al Disi, Doha (QA); Yahya Alhomsi, Doha (QA); Ibrahim Ahmed, Doha (QA); Fayçal Bensaali, Doha (QA); Abbes Amira, Doha (QA); Guillaume Alinier, Doha (QA)

(73) Assignee: QATAR UNIVERSITY, Doha (QA)

( * ) Notice: Subject to any disclaimer, the term of this patent is extended or adjusted under 35 U.S.C. 154(b) by 348 days.

(21) Appl. No.: 16/271,651

(22) Filed: Feb. 8, 2019

(65) Prior Publication Data

US 2019/0251869 A1 Aug. 15, 2019

Related U.S. Application Data

(60) Provisional application No. 62/630,178, filed on Feb. 13, 2018.

(51) Int. Cl.
*G09B 23/30* (2006.01)
(52) U.S. Cl.
CPC .................. *G09B 23/303* (2013.01)
(58) Field of Classification Search
CPC ........................ G09B 23/303; G09B 23/285
See application file for complete search history.

(56) References Cited

U.S. PATENT DOCUMENTS

| 4,585,056 | A | 4/1986 | Oscarsson | |
|---|---|---|---|---|
| 7,993,799 | B2* | 8/2011 | Mennig | G02B 3/0087 430/1 |
| 2003/0171237 | A1* | 9/2003 | Stavrakas | C11D 3/40 510/327 |
| 2006/0287215 | A1* | 12/2006 | McDonald | C11D 9/444 510/441 |
| 2009/0124925 | A1* | 5/2009 | MacDonald | A61B 5/01 600/549 |
| 2011/0077527 | A1* | 3/2011 | Yang | A61K 49/0006 600/474 |
| 2019/0027064 | A1* | 1/2019 | Nelson | G09B 23/303 |
| 2020/0268559 | A1* | 8/2020 | Lafferty | A61F 13/00059 |

OTHER PUBLICATIONS

Anderson, et al; "Simulating extracorporeal membrane oxygenation emergencies to improve human performance. Part I: Methodologic and technologic innovations", Technical Reports/Simulation in Healthcare, Winter 2006, vol. 1, No. 4, pp. 220-227.

(Continued)

*Primary Examiner* — Kurt Fernstrom
(74) *Attorney, Agent, or Firm* — Squire Patton Boggs (US) LLP

(57) ABSTRACT

Provided herein are a method of using thermochromic ink for blood simulation in medical training and a method of using thermochromic ink for blood simulation. A prominent application is for simulation of Extracorporeal Membrane Oxygenation (ECMO) simulation.

11 Claims, 5 Drawing Sheets
(5 of 5 Drawing Sheet(s) Filed in Color)

(56) References Cited

OTHER PUBLICATIONS

LCR Hallcrest Ltd. Chameleon® Thermochromic Water Based Screen ink [Internet]. Connah's Quay; 2016. Available from: http://www.lcrhallcrest.com/chameleoninks/resources/pdf/from%20Linda/TDS/Thermochromic%20WB%20Screen%20Ink%201%20Part%20System.pdf [Accessed Oct. 29, 2016].

Alsalemi, et al; "Using thermochromic ink for medical simulations", 4th Annual ELSO-SWAC Conference Proceedings, Qatar Medical Journal, Feb. 14, 2017, vol. 2017, Art. 63, pp. 1-2.

Alsalemi, et al; "Using thermochromic ink for medical simulations", Qatar University College of Engineering, Undergraduate, Sciences and Engineering, 2017 Poster presentation at ELSO-SWAC 2017 conference in Doha, Qatar, Feb. 17, 2017, pp. 1-2.

Presentation at HMC about a medical simulator on Oct. 12, 2015, one page.

Aldisi, et al; "Design and implementation of a modular EMCO simulator", 4th Annual ELSO-SWAC Conference Proceedings, Slides from Oral presentation, Feb. 17, 2017, 12 pages.

Aldisi, et al; "Design and implementation of a modular EMCO simulator", 4th Annual ELSO-SWAC Conference Proceedings, Qatar Medical Journal, Feb. 14, 2017 (online), vol. 2017, Art. 62, pp. 1-2.

Aldisi, M., "Revolutionizing ECMO simulation with affordable yet high-Fidelity technology", Article in Press, American Journal of Emergency Medicine, Nov. 15, 2017 (online publication), https://doi.org/10.1016/j.ajem.2017.11.036., pp. 1-3.

International Search Report and Written Opinion dated Aug. 2, 2019 for Application No. PCT/IB2019/051045, 9 pages.

Aldisi, et al; "Design and implementation of a modular EMCO simulator", Qatar Medical Journal, published online Feb. 14, 2017; vol. 17, No. 1, Art. 62, Abstract.

\* cited by examiner

24°C — Dark Red  35°C — Bright Red

USING THERMOCHROMIC INK FOR BLOOD SIMULATION IN MEDICAL TRAINING

CROSS-REFERENCE TO RELATED APPLICATION

This application claims benefit of and priority to, under 35 U.S.C. § 119(e), U.S. Provisional Application No. 62/630,178, entitled USING THERMOCHROMIC INK FOR BLOOD SIMULATION IN MEDICAL TRAINING, filed on Feb. 13, 2018, the content of which is incorporated by reference in its entirety herein.

FIELD OF INVENTION

The invention disclosed herein relates to blood simulation in medical training where blood color change is a significant visual cue, for example in Extracorporeal Membrane Oxygenation (ECMO) simulation. In addition to ECMO simulation, there may be other medical applications.

BACKGROUND

In medical simulation and training, blood is used to exhibit its different behaviors in context. In some cases, blood color differential is an imperative visual effect to ensure high-fidelity training and practical understanding. High simulation realism is usually achieved by using animal or artificial blood (which mimics some biological features of blood), which has high cost, requires disposable equipment such as oxygenators, and entails contamination or infection risks.

Extracorporeal membrane oxygenation (ECMO) is a high-complexity life-saving procedure riddled with mechanical complications that can place the patient in a critical state where fast and coordinated actions are required to avoid mortality. Thus, patients on ECMO are supervised round the clock by highly trained nurses and perfusionists. Currently, ECMO training programs include patient emergency simulations performed with different levels of success. Some training facilities use mannequins that have computer-controlled physiological parameters such as heart rate and oxygen saturation. The circuit parameters such as pressure are manually adjusted per scenario; air and artificial blood are manually injected to indicate problems such as air embolism, and hypovolemia. See Anderson J, Boyle K, Murphy A, Yaeger K, LeFlore J, Halamek L. Simulating extracorporeal membrane oxygenation emergencies to improve human performance. Part I: Methodologic and technologic innovations. *Simul Healthc.* 2006; 1(4):220-227. Despite being realistic, using an actual ECMO circuit for simulation training purposes has disadvantages such as the use of expensive disposable equipment (oxygenation membrane), lack of oxygenation color differentials, and manual circuit adjustments and injections.

SUMMARY

In one embodiment of the invention herein, it is provided a method of using thermochromic ink for blood simulation in medical training, the method comprising:
providing a thermochromic fluid for blood simulation where blood color is to be simulated; wherein the thermochromic fluid comprises a thermochromic ink;
adjusting the temperature of the fluid thereby altering the color of the fluid; wherein the color of the fluid is bright red when the temperature of the fluid is 31° C. or higher, and the color of the fluid is dark red when the temperature of the fluid is 28° C. or lower.

In one embodiment of the invention herein it is provided a method of using thermochromic ink for blood simulation for Extracorporeal Membrane Oxygenation (ECMO) simulation, the method comprising:
(1) providing a thermochromic fluid in a tank, wherein the tank comprises two outlets one connected to a tubing circuit and the other connected to a pump, wherein the fluid comprises a thermochromic ink;
(2) pumping the fluid by the pump from the tank into a first tubing section, the first tubing section runs through a first heat exchanger;
(3) adjusting the fluid by the first heat exchanger while the fluid flows in the first tubing section so that the temperature of the fluid is adjusted to a first temperature;
(4) flowing the fluid from the first heat exchanger into a second tubing section, the second tubing section runs through a second heat exchanger;
(5) adjusting the fluid by the second heat exchanger while the fluid flows in the second tubing section so that the temperature of the fluid is adjust to a second temperature;
(6) flowing the fluid from the second heat exchanger back to the tank;
wherein the first temperature and the second temperature are different;
wherein the tubing circuit optionally comprises an additional tubing section that connects the tank and the pump, the pump and the first tubing section, the first tubing section and the second tubing section, or the second tubing section and the tank.

In one embodiment of the method, the first heat exchanger is where cooling occurs, and the second heat exchanger is where heating occurs.

In one embodiment herein, it is provided a thermochromic fluid for blood simulation, the composition comprising: a thermochromic ink, water, and a non-staining dye.

In one embodiment of the invention herein, it is provided a system for simulating Extracorporeal Membrane Oxygenation (ECMO) using the thermochromic fluid disclosed herein, the system comprising: a heating device, and cooling device, a tubing circuit; wherein the heating device and the cooling device are connected with the tubing circuit.

BRIEF DESCRIPTION OF DRAWINGS

The patent or application file contains at least one drawing executed in color. Copies of this patent or patent application publication with color drawing(s) will be provided by the Office upon request and payment of the necessary fee.

DETAILED DESCRIPTION

Prior blood simulation practices include the use of artificial blood or animal (e.g., sheep) blood and oxygenated by special machines called oxygenators, which is highly expensive, unreusable, and highly contaminating. The invention disclosed herein provides a solution to the problems, which provides a high-fidelity blood color change simulation method while significantly costing less, maintaining reusability, and is not contaminating. The blood simulation provided herein does not resembling other blood features such as viscosity, smell, molecular structure, and acidity. The solution features the use of thermochromic ink (mixed with non-staining dyes) to simulation blood and adjustment of temperature to alter the color of simulated blood (simulating oxygenated/deoxygenated blood). These features have not been used in the field of blood simulation before the invention was made.

The present application provides a novel method for blood simulation using the thermal properties of thermochromic ink. The color of a thermochromic ink can be altered by adjustment of temperature. See LCR Hallcrest Ltd. Chameleon® Thermochromic Water Based Screen ink [Internet]. The unique red color of blood can be mimicked to a high fidelity using a custom hue of thermochromic ink. Then, by adjusting its temperature, realistic dark and bright red can be employed to simulate the low and high oxygen concentrations of blood, respectively.

The invention of the present application is useful in medical training and simulation where blood simulation is employed.

Blood simulation of the present invention has been tested on a modular extracorporeal membrane oxygenation (ECMO) simulator which requires blood simulation, and especially color differential as a visual cue to indicate ECMO circuit complications. Experimental results have proven its efficacy as a practical solution for medical simulations. A heater/cooler circuit (see FIG. 1) was employed to allow continuous heating/cooling of thermochromic fluid and simulating color change. In addition to ECMO simulation, other medical applications are being considered. FIG. 2 depicts color change of thermochromic ink through temperature adjustment. The color of the thermochromic fluid is dark red at 24° C. and bright red at 35° C.

Figure 1:
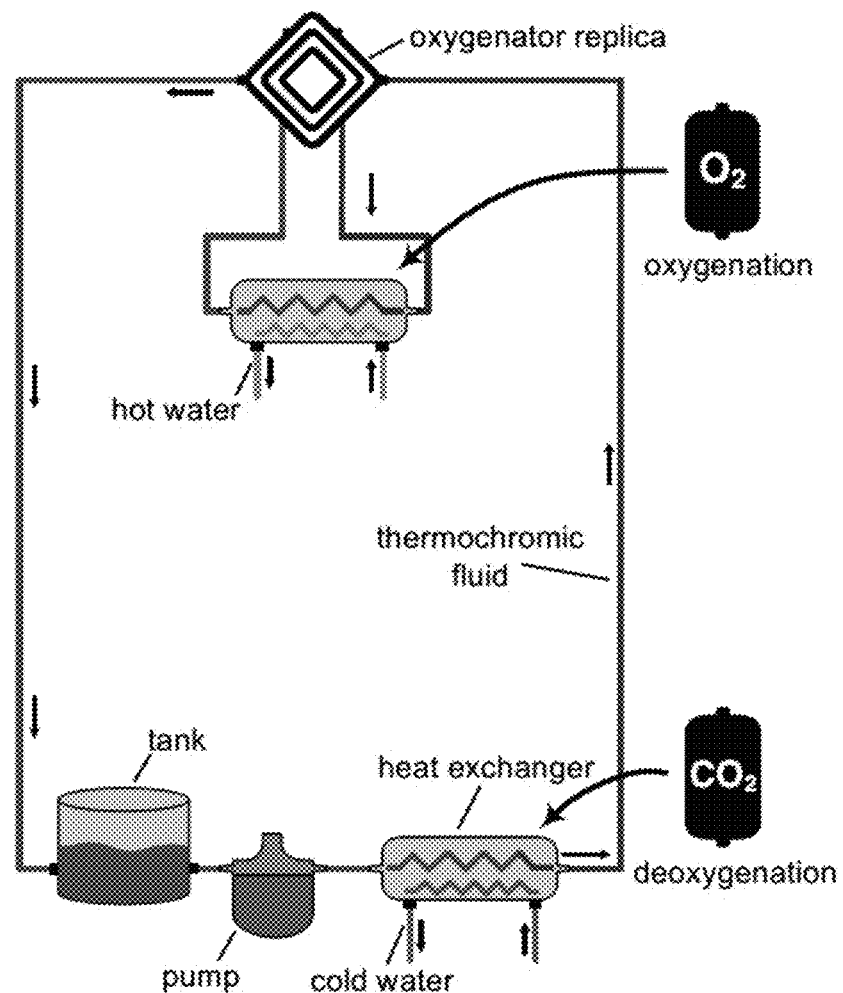
FIG. 1 illustrates a diagram of the thermochromic system.
Figure 2:
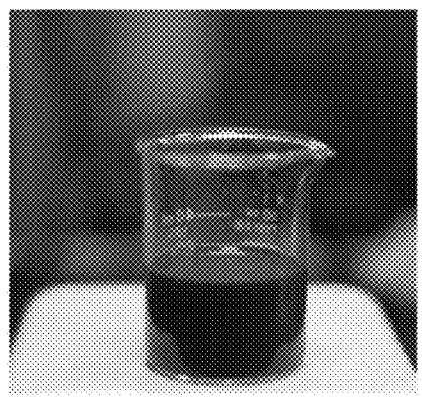
FIG. 2 depicts experimental results showing color change of thermochromic ink through temperature adjustment.
Figure 2:
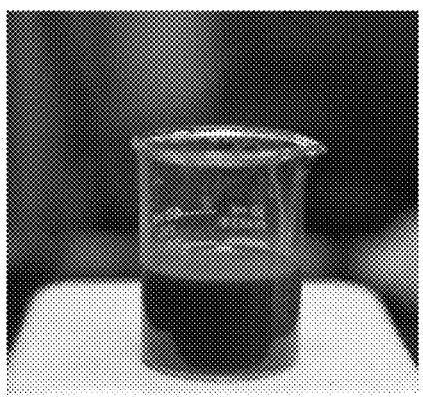

In one embodiment, it is provided a system for ECMO simulation as shown in FIG. 1. FIG. 1 shows a thermochromic loop or circuit. The circuit comprises a tank having at least two outlets, one is connect to one end of a tubing and the other is connected to a pump. The tank contains a thermochromic fluid. The pump is connected to the other end to the tubing. A section of the tubing (i.e. a first section) runs through a heat exchanger (the lower heat exchanger, a cooling device). The pump pumps the fluid into the tubing and propels the fluid to flow in the tubing. The fluid is cooled to a first pre-determined temperature (e.g., 28° C. or lower) when it flows through the lower heat exchanger and the color of the fluid becomes dark red. The cooling process simulates the deoxygenation process in a patient's body. Another section of the tubing (i.e., a second section) runs through a heating device (the upper heat exchanger) which is coupled to an oxygenator replica of a real ECMO. The fluid is heated to a second pre-determined temperature (e.g., 31° C. or higher) when it flows through the heating device and the color of the fluid becomes bright red. The heating process simulates the oxygenation process in a patient's body. The fluid continues to flow back in the tubing and back to the tank. There is a tubing section between the tank and the pump, the pump and the first tubing section, the first tubing section and the second tubing section, the second tubing section and the tank, as needed. The length of each section can vary depending on the design. The tank and the pump can be connected by a connecting means known in the relevant art.

The major advantages or unique aspects of the proposed solution are reusability and cost. Thermochromic ink can be used for multiple simulations without any noticeable change in quality. It also costs significantly less than using actual or artificial blood. Hence, saving the medical center/hospital a substantial cost thanks to the reusability of Invention.

Figure 3:
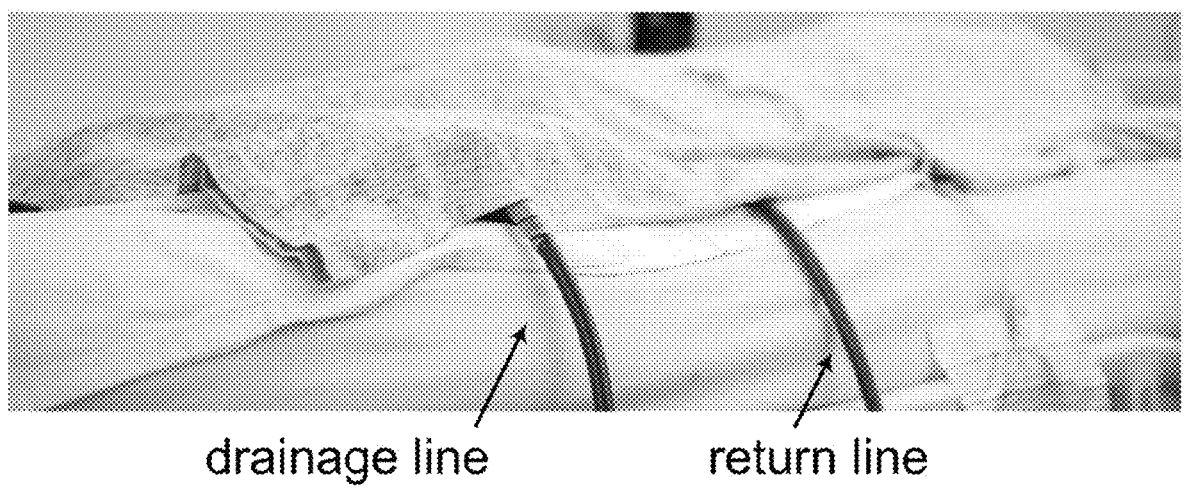
FIG. 3 shows the preliminary results of simulating blood color change using thermochromic ink.

Preliminary experimental results of simulating blood color change in extracorporeal membrane oxygenation (ECMO) simulation are shown in FIG. 3. FIG. 3 shows the color of a thermochromic fluid before cooling and after cooling in blood simulation. To prevent membrane occlusion because of the thermochromic ink, the latter needs to be pierced or replicated as bypass. In addition to ECMO simulation, other medical applications are being considered.

The use of thermochromic ink in medical training provides reproducible color change simulation features of blood while maintaining significantly lower equipment costs and contamination risks as all circuit components can be reused.

Figure 4:
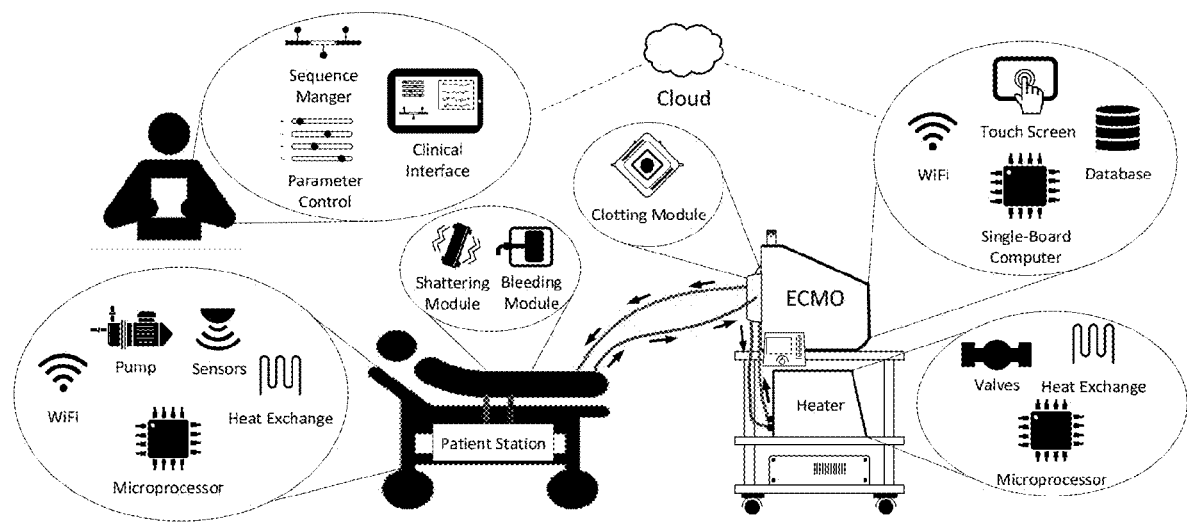
FIG. 4 shows a block diagram of an ECMO simulator.

The present application provides a design of a modular ECMO simulator centered on the use of thermochromic ink and instructor/clinician interface to re-create the ECMO circuit and its functionalities using affordable, reusable, and extensible mechanisms that do not require the presence of a real ECMO machine. The block diagram of the simulator is shown in FIG. 4. Oxygenation is visually simulated by heating and cooling thermochromic ink, allowing it to switch between dark and light red. A replica of an ECMO machine's console interface allows manual adjustment of parameters wirelessly through a tablet instructor application. Furthermore, the visual and audio cues of mechanical complications such as access line shattering can be easily implemented using mechanical vibrators.

Advantages of the proposed application of the invention include the removal of the cost barrier and inconvenience of current ECMO simulators, while adding modularity and customizability to simulate a multitude of emergency scenarios, thus increasing the accessibility, fidelity, and versatility of ECMO patient management training.

In one embodiment of the invention herein, it is provided a method of using thermochromic ink for blood simulation in medical training, the method comprising:

providing a thermochromic fluid for blood simulation where blood color is to be simulated; wherein the thermochromic fluid comprises a thermochromic ink;

adjusting the temperature of the fluid thereby altering the color of the fluid; wherein the color of the fluid is bright red when the temperature of the fluid is 31° C. or higher, and the color of the fluid is dark red when the temperature of the fluid is 28° C. or lower.

The bright red color resembles the color of real blood in oxygenated state. The dark red color resembles the color of real blood in deoxygenated state.

In some embodiments of the method described above, the adjusting the temperature of the fluid is by heating the fluid using hot water or by cooling the fluid using cold water.

In some embodiments including any of the foregoing embodiments, the adjusting the temperature of the fluid is by heating the fluid to 31° C. or higher, or by cooling the fluid to 28° C. or lower.

In a current embodiment including any of the foregoing embodiments, the fluid further comprises water and a non-staining dye.

In some embodiments including any of the foregoing embodiments, the blood simulation is for Extracorporeal Membrane Oxygenation (ECMO) simulation.

In some embodiments including any of the foregoing embodiments, the adjusting the temperature of the fluid comprises cooling the fluid to 24° C. and subsequently heating the fluid to 35° C.; or heating the fluid to 35° C. or higher and subsequently cooling the fluid to 24° C. or lower.

In one embodiment of the invention herein it is provided a method of using thermochromic ink for blood simulation for Extracorporeal Membrane Oxygenation (ECMO) simulation, the method comprising:

(1) providing a thermochromic fluid in a tank, wherein the tank comprises two outlets one connected to a tubing circuit and the other connected to a pump, wherein the fluid comprises a thermochromic ink;

(2) pumping the fluid by the pump from the tank into a first tubing section, the first tubing section runs through a first heat exchanger;

(3) adjusting the temperature of the fluid by the first heat exchanger to a first temperature while the fluid flows in the first tubing section;

(4) flowing the fluid from the first heat exchanger into a second tubing section, the second tubing section runs through a second heat exchanger;

(5) adjusting the temperature of the fluid by the second heat exchanger to a second temperature while the fluid flows in the second tubing section;

(6) flowing the fluid from the second heat exchanger back to the tank;

wherein the first temperature and the second temperature are different;

wherein the tubing circuit optionally comprises an additional tubing section that connects the tank and the pump, the pump and the first tubing section, the first tubing section and the second tubing section, or the second tubing section and the tank.

In one embodiment of the method described above, the first heat exchanger is where cooling occurs, and the second heat exchanger is where heating occurs.

In some embodiments of the method described above, the heating device uses hot water to heat the fluid and the cooling device uses cold water to cool the fluid.

In some embodiments including any of the foregoing embodiments, the fluid is cooled to 28° C. or lower by the cooling device. In some embodiments, the fluid is cooled to 24° C. The color of the fluid is dark red when the fluid is 28° C. or lower. The dark red color resembles the color of real blood in deoxygenated state.

In some embodiments including any of the foregoing embodiments, the fluid is heated to 31° C. or higher by the heating device. In some embodiments, the fluid is heated to 35° C. The color of the fluid is bright red when the fluid is 31° C. or higher. The bright red color resembles the color of real blood in oxygenated state.

In one embodiment of the invention including any of the foregoing embodiments, it is provided a method of using thermochromic ink for blood simulation in Extracorporeal Membrane Oxygenation (ECMO) simulation, the method comprising:

(1) providing a thermochromic fluid in a tank, the tank comprises two outlets one connected to one end of a tubing circuit and the other is connected to a pump, wherein the fluid comprises a thermochromic ink;

(2) pumping the fluid by the pump from the tank into a first tubing section, the first tubing section runs through a cooling device;

(3) cooling the fluid by the cooling device while the fluid flows in the first tubing section so that the fluid is cooled to a temperature of 28° C. or lower and the color of the fluid becomes dark red;

(4) flowing the fluid from the first tubing section into a second tubing section, the second tubing section runs through a heating device;

(5) heating the fluid by the heating device while the fluid flows in the second tubing section so that the fluid is heated to a temperature of 31° C. or higher and the color of the fluid becomes bright red; and (6) flowing the fluid heated by the heating device back to the tank;

wherein the tubing circuit optionally comprises an additional tubing section that connects the tank and the pump, the pump and the first tubing section, the first tubing section and the second tubing section, or the second tubing section and the tank; and wherein the cooling device simulates deoxygenation and the heating device simulates oxygenation or an oxygenator.

In some embodiments of the method described above, the heating device uses hot water to heat the fluid and the cooling device uses cold water to cool the fluid.

In some embodiments including any of the foregoing embodiments, the fluid is cooled to a temperature of 24° C. in step (3).

In some embodiments including any of the foregoing embodiments, the fluid is heated to a temperature of 35° C. in step (5).

In some embodiments including any of the foregoing embodiments, the method comprises observing the fluid color and the change thereof. The color of the fluid is bright red when the fluid is heated to 31° C. or higher. The color of the fluid is dark red when the fluid is cooled to 28° C. or lower. The bright red color resembles the color of real blood in oxygenated state. The dark red color resembles the color of real blood in deoxygenated state.

In some embodiments including any of the foregoing embodiments, the fluid further comprises water, and a non-staining dye or a combination of non-staining dyes.

In one embodiment of the invention herein, it is provided a thermochromic fluid for blood simulation, the fluid comprising a thermochromic ink, water, optionally at least one non-staining dye. The thermochromic fluid can be used in any of the methods disclosed and claimed herein. The color of the fluid is bright red when the temperature of the fluid is 31° C. or higher. The color of the fluid is dark red when the temperature of the fluid is 28° C. or lower. The bright red color is resembles the color of real blood in oxygenated state. The dark red color resembles the color of real blood in deoxygenated state.

In some embodiments of the thermochromic fluid, the thermochromic ink is Black Thermochromic Ink 31° C., for example available from Good Life Innovations Ltd. In some embodiments including any of the foregoing embodiments, the non-staining dye is non-staining yellow dye, for example available from Mayhems Solutions Ltd. In some embodiments, the non-staining dye is non-staining pink/red dye, for example available at Mayhems Solutions Ltd. In some embodiments, the thermochromic fluid comprises a combination of non-staining dyes.

In some embodiments including any of the foregoing embodiments, the concentration of the black thermochromic ink is about 17 grams per liter. In some embodiments including any of the foregoing embodiments, the concentration of the black thermochromic ink is about 10 to about 20 grams per liter.

In some embodiments including any of the foregoing embodiments, the concentration of the Non-Staining Yellow Dye is about 0.02 liters for every liter of distilled water and the concentration of the Non-Staining Pink Dye is about 0.04 liters for every liter of distiller water. In some embodiments including any of the foregoing embodiments, the concentration of the Non-Staining Yellow Dye is about 0.01 to about 0.04 liters for every liter of distilled water and the concentration of the Non-Staining Pink Dye is about 0.02 to about 0.05 liters for every liter of distiller water.

In one embodiment of the invention herein, it is provided a system for simulating Extracorporeal Membrane Oxygenation (ECMO) using the thermochromic fluid disclosed herein, the system comprising: a tank, a pump, a tubing circuit, a heating device, and a cooling device. The system can be used in any of the methods disclosed and claimed herein.

In some embodiments of the system, the tank comprises two outlets wherein one is connected to one end of a tubing circuit and the other is connected to a pump. The tank contains a thermochromic fluid. The pump is connected to the other end of the tubing circuit. The pump pumps the fluid into the tubing and propels the fluid to flow in the tubing.

In some embodiments including any of the foregoing embodiments, the tubing circuit comprises a section that runs through a cooling device. The cooling device cools the fluid to a first pre-determined temperature (e.g., 28° C. or lower) when the fluid flows through the cooling device and the color of the fluid becomes dark red. In some embodiments, the first pre-determined temperature is 24° C. The cooling process simulates the deoxygenation process in a patient body.

In some embodiments including any of the foregoing embodiments, the tubing circuit comprises a tubing section that runs through a heating device which is coupled to an oxygenator replica of a real ECMO. The heating device heats the fluid to a second pre-determined temperature (e.g., 31° C. or higher) when the fluid flows through the heating device and the color of the fluid becomes bright red. In some embodiments, the second pre-determined temperature is 35° C. The heating process simulates the oxygenation process in ECMO.

In some embodiments including any of the foregoing embodiments, the tubing circuit comprises additional tubing section that connects the tank and the pump, the pump and the first tubing section, the first tubing section and the second tubing section, or the second tubing section and the tank. In some embodiments, there is a tubing section between the tank and the pump. In some embodiments, there is a tubing section between the section running through the cooling device and the section running through the heating device. In some embodiments, there is a tubing section between the section running through the heating device and the tank. The length of each tubing section can vary depending on the design.

EXAMPLES AND EXPERIMENTS

Example 1

Using a heater/cooler system connected with a tubing circuit, a mixture of thermochromic ink and water flows through the circuit. When heated above the activation temperature (31° C.), mixture color is bright red (simulating blood oxygenation). When cooled below the activation temperature (28° C.), the mixture becomes dark red (simulating blood deoxygenation). The ink remains dark red at room temperature.

Example 2

To increase the realism of inks color, the composition of the thermochromic fluid was adjusted. Adding additional red and yellow non-staining dyes resulted in a shade of red closer to that of the blood. The ink was tested on a specified range of temperature to obtain a detailed color change pattern. In addition, different concentrations of thermochromic ink and dyes were tested to determine the optimum blood color recipe.

Example 3

Figure 5:
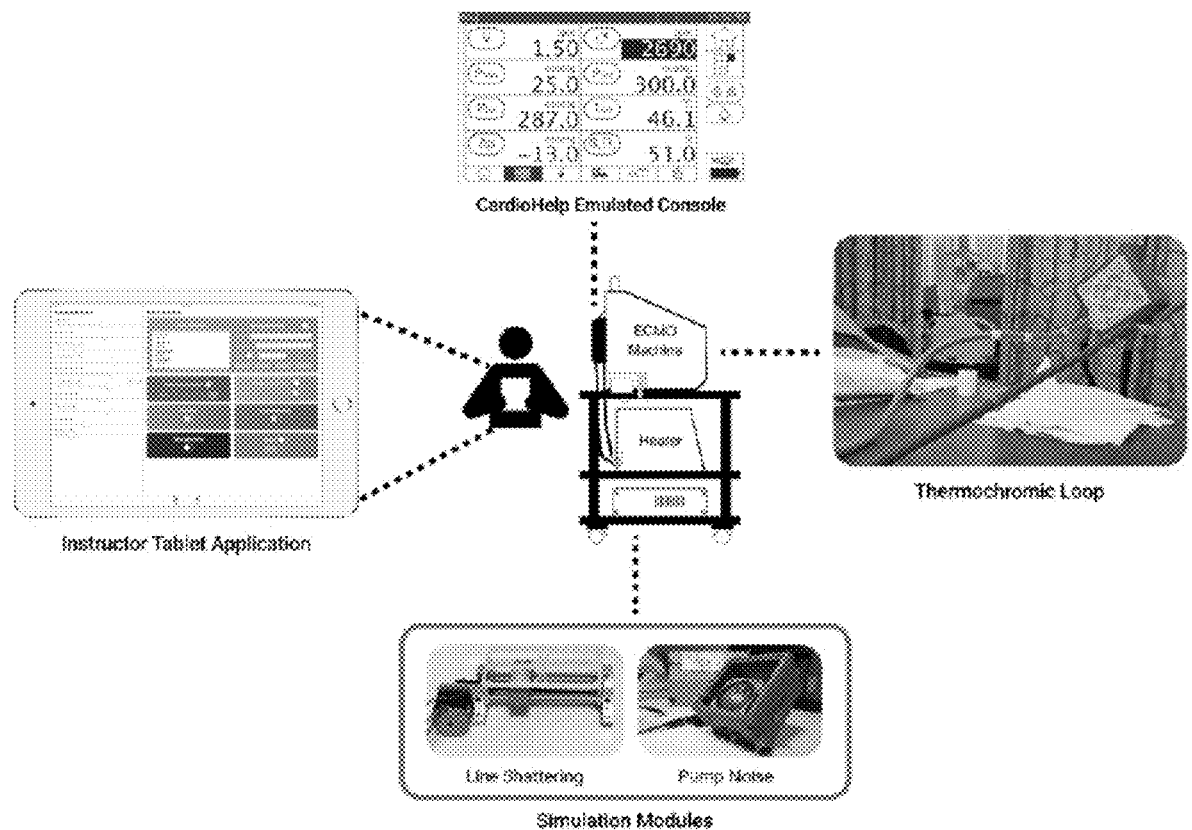
FIG. 5 illustrates a prototype ECMO simulator.

A standalone ECMO simulator based on the philosophies of physical fidelity and modularity has been developed. Physical fidelity deals with simulating the visual and audio cues of a given phenomenon while not necessarily producing it physiologically. Modularity, on the other hand, focuses the design process on implementing mechanisms that recreate the ECMO systems phenomena using affordable, extensible, independent components. The fundamental ECMO functions were first pursued. Blood oxygenation and circulation is simulated by streaming thermochromic fluid through two heat exchangers using a commercial pump. Thermochromic ink is a substance with a special chemical composition that allows it to change its color based on temperature adjustment. Heating and cooling the fluid at different parts of the "ECMO circuit" continually shifts its color between light and dark red, simulating blood oxygenation and circulation. A replica of the circuit's oxygenator was 3D printed, externally resembling the look of the MAQUET HLS oxygenator. From the inside, it contains a bypass tube, circulating the thermochromic fluid from the access to the return ports. Concluding the fundamental functions, the ECMO console interface is emulated on a single-board computer connected to a touchscreen. The parameters visible on the "ECMO screen" are stored in a real-time cloud remotely accessible by instructors using a tablet application. This enables on-the-spot adjustment of circuit and blood parameters and controlling the system modules. In addition, the instructor tablet application offers a sequence designer that allows instructors to create and store simulation scenarios for blueprinting a standardized training curriculum and automate some parametric changes on a timeline or as desired by the instructor. FIG. 5 illustrates such a prototype simulator.

On top of the fundamental layer of the simulator, additional wirelessly controlled modules are added to simulate visual or audio effects of specific ECMO emergencies. A linear motion device is used to create vibrations within the drainage tube, simulating line-shattering. A bleeding module can discharge blood-like liquid anywhere on the mannequin, simulating patient bleeding. Valves are used to disable temperature change in the thermochromic fluid, creating a mono-colored circuit, simulating hypoxemia or recirculation. Table 1 summarizes the simulator modules and the potential cases when they would be used.

In addition to providing a realistic and versatile platform for ECMO simulation, the example simulator is considered affordable in comparison with other high-fidelity solutions. System modules are built from commercially available components (pumps, heat-exchangers, microcontrollers, etc.). It is also enclosed by low-cost 3D-printed casing.

Example 4

A thermochromic dye was prepared by mixing the following for every liter of distilled water: Black Thermochromic Ink 31C (17 g), Non-Staining Yellow Dye (0.03 L), and Non-Staining Pink Dye (0.04 L).

REFERENCES CITED IN THE SPECIFICATION

1. LCR Hallcrest Ltd. Chameleon® Thermochromic Water Based Screen ink [Internet]. Connah's Quay; 2016. Available from: http://www.lcrhallcrest.com/chameleoninks/resources/pdf/from%20Linda/TDS/Thermochromic%20WB%20Screen%20Ink%201%20Part%20System.pdf [Accessed 29 Oct. 2016].
2. Anderson J, Boyle K, Murphy A, Yaeger K, LeFlore J, Halamek L. Simulating extracorporeal membrane oxygenation emergencies to improve human performance. Part I: Methodologic and technologic innovations. *Simul Healthc.* 2006; 1(4):220-227.

What is claimed is:

1. A method of using thermochromic ink for blood simulation in medical training, the method comprising:
   providing a thermochromic fluid for blood simulation where blood color is to be simulated; wherein the thermochromic fluid comprises a thermochromic ink;
   adjusting the temperature of the fluid thereby altering the color of the fluid; wherein the color of the fluid is bright red when the temperature of the fluid is 31° C. or higher, and the color of the fluid is dark red when the temperature of the fluid is 28° C. or lower;
   wherein the bright red resembles the color of real blood in oxygenated state; and wherein the dark red resembles the color of real blood in deoxygenated state.

2. The method of claim 1, wherein the adjusting the temperature of the fluid is by heating the fluid using hot water or by cooling the fluid using cold water.

3. The method of claim 1, wherein the adjusting the temperature of the fluid is by heating the fluid to 31° C. or higher, or by cooling the fluid to 28° C. or lower.

4. The method of claim 1, wherein the fluid further comprises water, and a non-staining dye or a combination of non-staining dyes.

5. The method of claim 4, wherein the thermochromic ink is black.

6. The method of claim 4, wherein the non-staining dye is selected from non-staining yellow dye and non-staining pink dye.

7. The method of claim 4, wherein the concentration of the thermochromic ink is 17 g/L.

8. The method of claim 4, wherein the concentration of the Non-Staining Yellow Dye is 0.03 liters for every liter of distilled water and the concentration of the Non-Staining Pink Dye is 0.04 liters for every liter of distiller water.

9. The method of claim 1, wherein the blood simulation is for Extracorporeal Membrane Oxygenation (ECMO) simulation.

10. The method of claim 1, wherein the adjusting the temperature of the fluid comprises cooling the fluid to 28° C. or lower and subsequently heating the fluid to 31° C. or higher; or heating the fluid to 31° C. or higher and subsequently cooling the fluid to 28° C. or lower.

11. The method of claim 1, wherein the adjusting the temperature of the fluid comprises cooling the fluid to 24° C. or lower and subsequently heating the fluid to 35° C. or higher; or heating the fluid to 35° C. or higher and subsequently cooling the fluid to 24° C. or lower.

* * * * *